No. 696,093. Patented Mar. 25, 1902.
W. L. COLE.
LATHE FOR TURNING IRREGULAR FORMS.
(Application filed Feb. 25, 1901.)
(No Model.) 5 Sheets—Sheet 5.

WITNESSES:
Harry X Goss
J. Waies Bryce

INVENTOR
William L. Cole
BY
D. Howard Hayward
his ATTORNEY

UNITED STATES PATENT OFFICE.

WILLIAM L. COLE, OF BROOKLYN, NEW YORK, ASSIGNOR OF ONE-HALF TO WALLACE A. DOWNS, OF NEW YORK, N. Y.

LATHE FOR TURNING IRREGULAR FORMS.

SPECIFICATION forming part of Letters Patent No. 696,093, dated March 25, 1902.

Application filed February 25, 1901. Serial No. 48,734. (No model.)

*To all whom it may concern:*

Be it known that I, WILLIAM L. COLE, a citizen of the United States of America, and a resident of the borough of Brooklyn, county of Kings, city and State of New York, have invented certain new and useful Improvements in Lathes for Turning Irregular Forms- of which the following is a specification, reference being had to the accompanying drawings, forming a part thereof.

My invention relates to improvements in lathes, and particularly in lathes for turning irregular forms.

My invention consists in providing in a lathe for turning irregular forms a revoluble head through which stock to be operated upon may be fed, a pattern-controlled rotary cutter, a pattern-follower, and means for causing a relative movement of the pattern and follower the one with the other in directions both lengthwise and circumferential of the longitudinal axis of the pattern.

The main object of my invention is to provide an automatic lathe for turning irregular forms in which the stock may be fed in by hand by merely dropping it into a receiving-trough and in which every operation of the machine thereafter up to the delivery of the stock after it has been operated upon by the cutter and the return of the parts to a condition to receive another blank may be automatic.

My invention further consists in various details of construction and combination of parts, as will hereinafter more fully appear, and other objects of my invention will also be apparent.

I will now proceed to describe a lathe for turning irregular forms embodying my invention and will then point out the novel features in claims.

In the drawings which form a part of this specification.

In the embodiment of my invention herein illustrated the lathe is shown as provided with a bed 1, supported upon standards 2. A drive-shaft 3, having a drive-pulley 4 secured thereto, is mounted to rotate in fixed bearings 5 and 6. To that end of the drive-shaft opposite the end which carries the drive-pulley 4 is secured one member of a friction-clutch 7. A secondary shaft 8 is provided and is journaled in fixed bearings 9. The said shaft 8 carries at one end the secondary member 10 of the friction-clutch 7.

A feed-carriage is provided for initially supporting the stock to be operated thereon and for feeding forward the stock so supported. The carriage comprises a rear cross-head 11 and a revoluble feed-plunger 12. A pattern-carrier 13 is provided, and said pattern-carrier has a shaft 14, which extends rearwardly therefrom and which has a reduced portion 15 loosely engaging with a dependent arm of the cross-head 11 of the feed-carriage. The cross-head 11 of the carriage is slidably mounted upon stationary guide-rods 16, of which there are two, the said guide-rods supported in stationary supports 17 and 18. The carriage is further provided with a feed-rack 19, rigidly secured to the cross-head 11 and which is engaged by a feed-worm 20, by which longitudinal movement is given thereto. The worm 20 is mounted upon a shaft 21, at one end journaled in the bearing 22 and at the other end connected, by means of a universal joint 23, to a stub-shaft 24. The stub-shaft is mounted in a stationary bearing 25 and carries a bevel gear-wheel 26. The bevel gear-wheel engages with a corresponding bevel-wheel 27, mounted upon a stub-shaft 28, which carries also a change-gear 29. The shaft 28 is suitably journaled in a stationary bearing 30. The change-gear 29 is driven by the main shaft by means of an intermediate idler 31, with which the said gear 29 meshes, and a compound gear mounted upon a stationary stud 32, having a small set of teeth 33 in engagement with the idler 31 and a large set of teeth 34 in engagement with a drive-pinion 35, which is secured to the main shaft. The intermediate idler-gear 31 is mounted upon a stud secured to an arm 36, which is rotatably secured upon the fixed stud 32. A clamping-bolt 37, passing through a slot in the arm 36 and engaging with the bed of the machine, will lock the arm in such position as to permit the proper engagement of the gears 29 and 31. Should a change of speed be desired, the change-gear 29 may be removed and a gear of different size inserted. The intermediate idler may then be moved into correct position and locked in such position by means of the locking-bolt 37, as just described.

Figure 1:
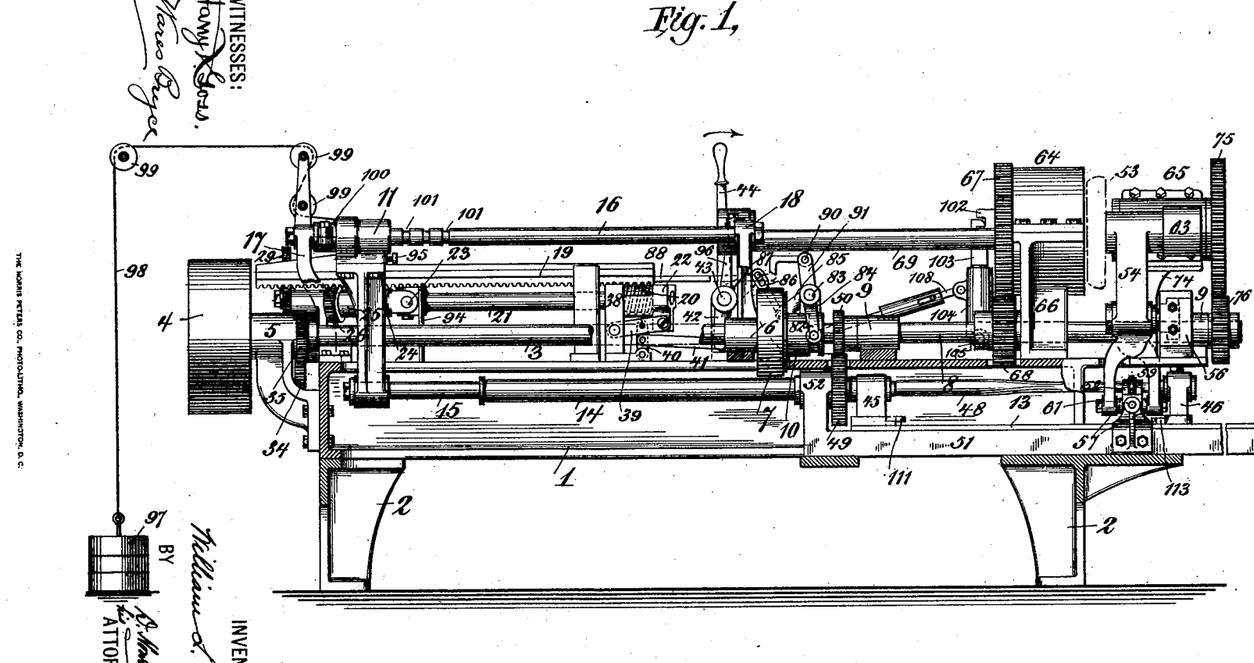
Figure 1 is a side elevation, partly in longitudinal section, of a lathe for turning irregular forms embodying my invention.
Figures 2, 3:
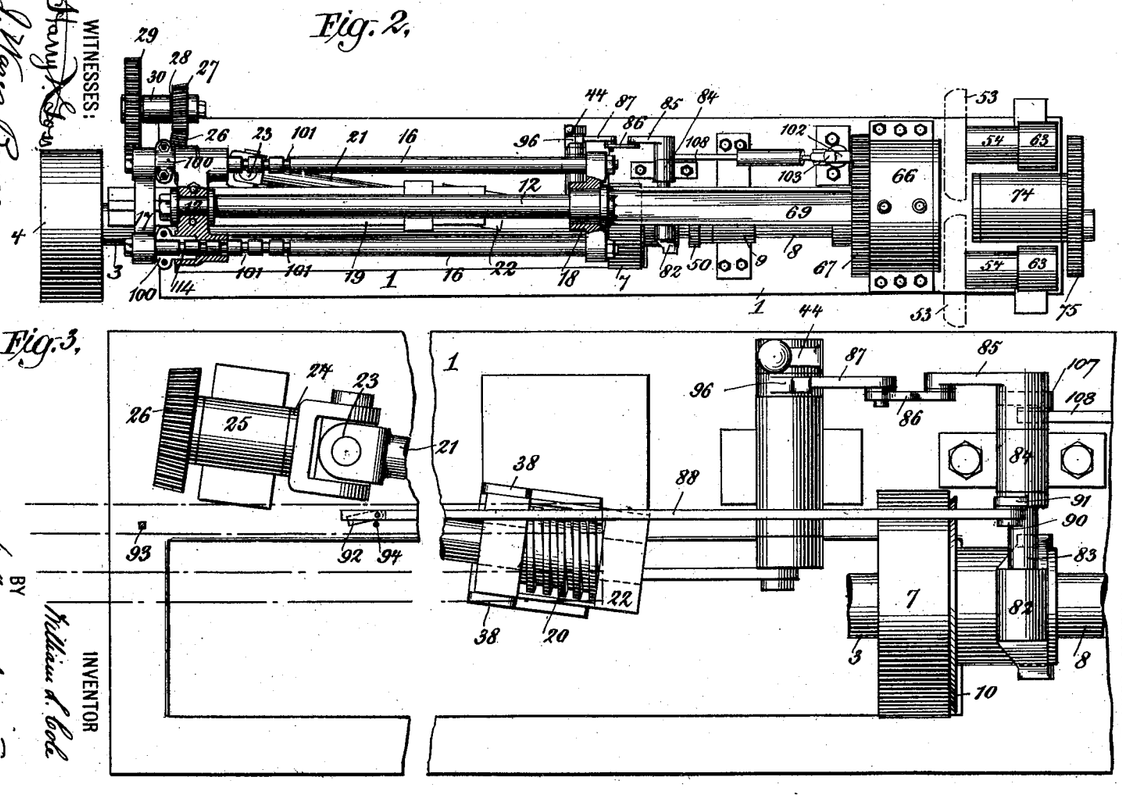
Fig. 2 is a top view of the same.
Fig. 3 is a top view, on an enlarged scale, of certain parts.

The bearing 22, in which the inner end of the worm-shaft 21 is journaled, is supported against movement laterally by means of a standard 38, the arms of which embrace the sides of the said bearing. (See more particularly Fig. 3.) A link 39 is pivotally secured to the standard 38 at one end and at the opposite end is pivoted to the bearing 22. Toggle-links 40 are arranged between the link 39 and a fixed point upon the bed of the machine. At the point at which the toggle-links are connected together they are further connected, by means of a connecting-rod 41, to an arm 42, fastened upon a rock-shaft 43. A starting-lever 44 is also secured to the rock-shaft 43. The normal position of the machine when at rest is with the lever 44 thrown to the right or in the direction of the arrow in Fig. 1, which movement will partially rotate the shaft 43 and will operate the toggle-links 40, through the connecting-rod 41, so as to draw the end of the worm-shaft 21 and the bearing 22 downwardly. In such position the worm 20 upon the shaft 21 is out of engagement with the teeth of the rack 19. When it is desired to start the machine, the lever is thrown to the position in which it is shown in Fig. 1, and the bearing 22 is lifted by the straightening of the toggle-links, so as to bring the worm 20 into engagement with the teeth of the rack 19. The universal joint 23, between the worm-shaft 21 and the shaft 24, permits the required relative movement of the shaft 21 with the stub-shaft 24.

Figure 4:
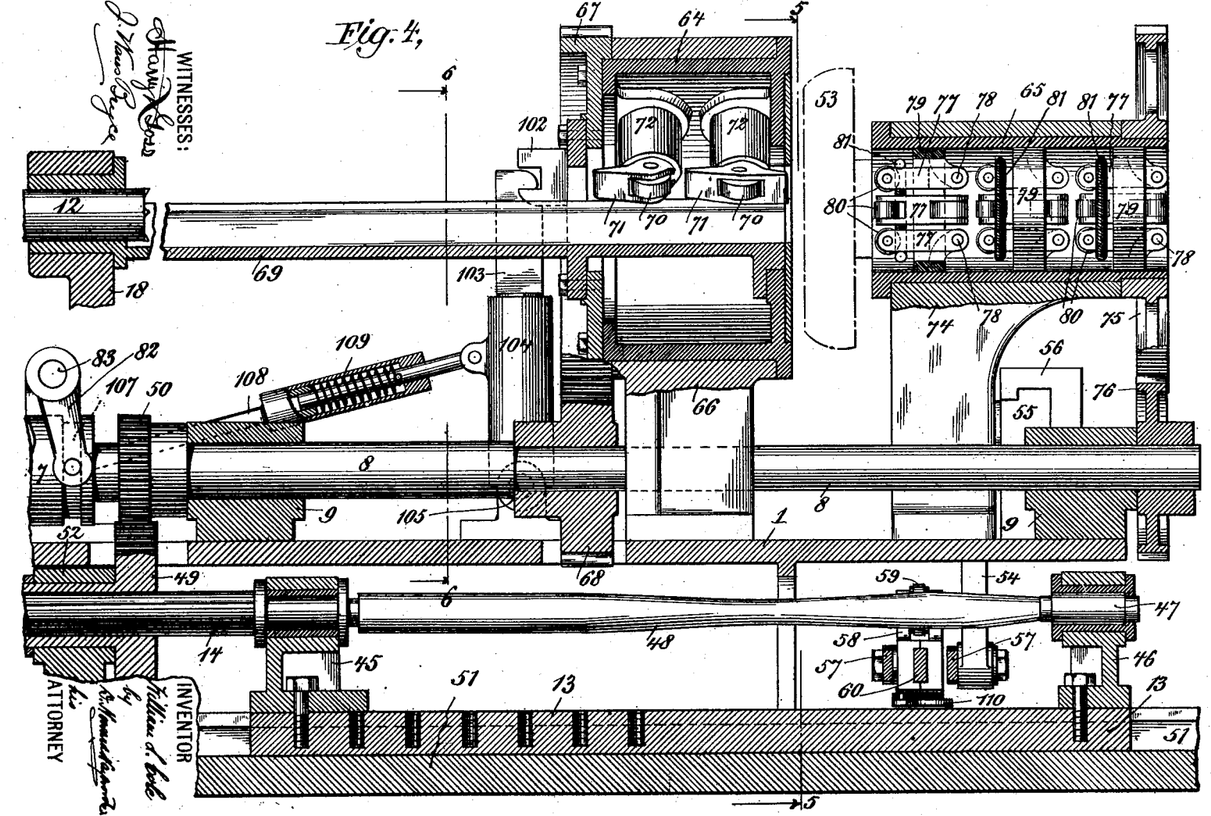
Fig. 4 is a central longitudinal sectional elevation of the two revoluble heads employed, the pattern and pattern carrier, and certain contiguous and correlated parts.

The pattern-carrier 13 has two supports, forming bearing-heads 45 and 46, rigidly secured thereto, as will be clearly seen by reference to Fig. 4. The inner end of the shaft 14 is journaled in the bearing-head 45, and a short head-shaft 47 is journaled in the bearing-head 46. A pattern 48 is supported by the inner end of the shaft 14 and the shaft 47, such pattern being removable and replaceable, as is common in this type of lathe. The pattern 48 will be secured to the shaft 14, so as to rotate therewith, and secured to rotate therewith by a spline connection is a gear-wheel 49. The gear-wheel 49 meshes with a gear-wheel 50, rigidly secured upon the secondary shaft 8.

The pattern-carrier 13 is mounted to slide in suitable ways in the guide-plate 51, secured to the bed of the machine. The guide-plate 51 carries a bearing-head 52, in which is journaled the hub or sleeve of the gear-wheel 49. This hub or sleeve is so mounted in the bearing 52 as to permit rotary movement of the said wheel, but is retained against movement longitudinally of its axis of rotation. The hub or sleeve of the wheel being splined upon the shaft 14, relative longitudinal movement of the said shaft with respect to the pattern is permitted.

I will now proceed to describe the rotary cutter mechanism and the means by which the rotary cutters are moved toward and away from the axis of rotation of the stock in accordance with the form of the pattern.

Figure 5:
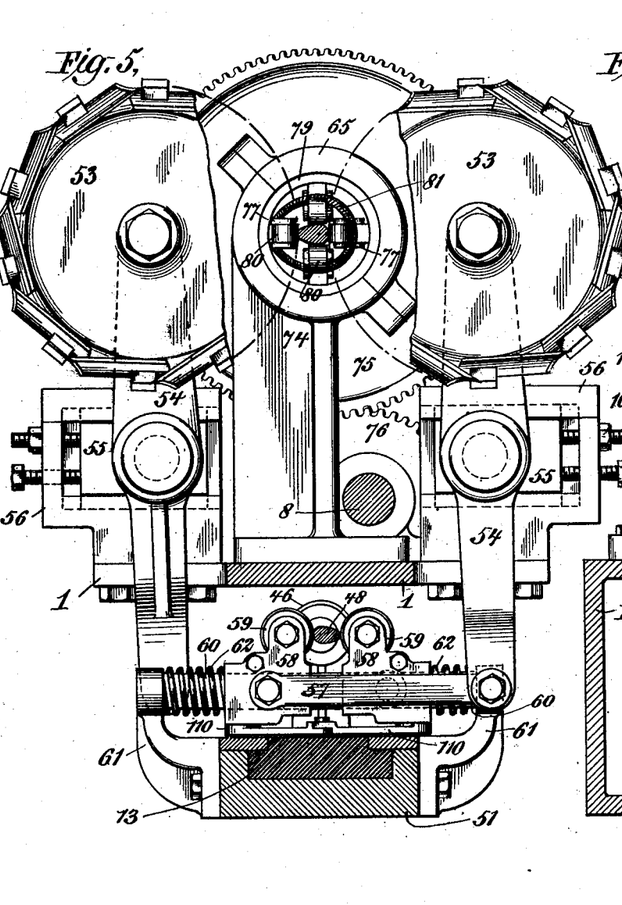
Fig. 5 is a transverse sectional elevation of certain parts, the plane of section being taken on the line 5 5 of Fig. 4.

Referring more particularly to Figs. 1 and 5 and in the first instance to Fig. 5, it will be seen that two rotary cutters 53 are provided, said cutters being suitably mounted at the ends of the upwardly-extending arms forming parts of the levers 54, pivotally supported in bearing-blocks 55. The bearing-blocks 55 are adjustably secured in boxes 56, bolted to the bed 1 of the machine. The bearing-blocks 55 are adjustable toward and away from each other, and by such adjustment the relative diameter of the stock with respect to the pattern may be varied. Locking-bolts are provided, as shown, for locking the bearing-blocks 55 in the position to which they are adjusted.

I will not describe the cutters 53 in detail, as in themselves they form no part in this present application. Any suitable revolving cutters may be employed. The lower or downwardly-extending arms of the levers 54 are connected by links 57 with pattern-followers 58. Each pattern-follower 58 is provided with a follower-roller 59, which engages with the pattern 48. The followers 58 are slidably mounted upon a bar 60, secured at opposite ends to brackets 61, bolted to the guide-plate 51, and springs 62 surround the bar 60 and bear at one end against the brackets 61 and at the other end against the pattern-followers 58, thereby tending to keep the follower-wheels 59 always in intimate engagement with the pattern 48. As the pattern 48 revolves the followers 58 will be moved backward and forward and through the links will transmit a similar movement to the cutters 53. The effect of this when the cutters are rotated at a high speed axially upon their supports will be to give the stock upon which they are operating a form similar to the pattern 48. Power is transmitted to rotate the cutters 53 by means of pulleys 63, which are mounted upon their shafts. The cutters are driven from an independent source, as is usual in machines of this type, for the reason that the rate of speed thereof is relatively so very much higher than the rate of speed of any other part of the machine.

Figure 6:
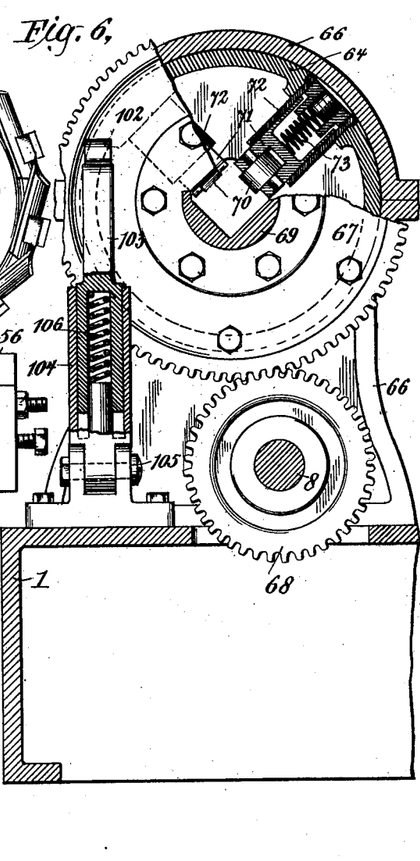
Fig. 6 is a transverse sectional elevation of certain parts, the plane of section being taken on the line 6 6 of Fig. 4.

I will now describe means whereby the stock may be revolved while it is being fed toward, past, and away from the cutters. For this purpose I have provided two rotary heads 64 and 65, the head 64 being arranged in advance of the cutters 53 and the head 65 at the rear thereof. The rotary head 64 is mounted to rotate in a fixed bearing 66, secured to the bed 1 of the machine, and derives its motion from the gear-wheel 67, which is secured thereto and which meshes with a pinion 68, secured to the secondary shaft 8. The rotary head 64 contains as a part thereof a feed-trough 69, which extends rearwardly and at its end is journaled in the head of the stationary support 18. The feed-plunger 12 passes through the rear end of the feed-trough 69 and in its normal rest position has its end slightly protruding into the open trough portion, as clearly shown in Figs. 2 and 4. The feed-trough is arranged clear through the rotary head 64 and terminates substantially flush with the front face thereof. The interior cross-section of the feed-trough 69 (see more particularly Fig. 6) is substantially that of two sides of a square, with the angle therein bisected by a line passing through the axis of rotation of the head. Spring pressure-rollers 70 are journaled in plungers 71, which are mounted in suitable casings 72, secured upon the inside of the rotary head. Springs 73 tend to force the pressure-rollers 70 toward the feed-trough. The said pressure-rollers are arranged two each in lines perpendicular to the two flat faces of the feed-trough 69. Stock to be operated upon is dropped into the feed-trough 69 at the rear end of the rotary head 64 and is forced forwardly by the plunger 12 until it meets the pressure-rollers 70. It is then forced forwardly under these rollers until it meets the cutters 53. Before it meets the cutters 53 the rotary heads and the feed-trough are caused to rotate in a manner to be presently explained, and the stock is then forced past the cutters 53 and into the rotating head 65. The rotary head 65 is arranged to rotate in a fixed support 74, secured to the bed 1 of the machine, and secured to the said rotary head is a spur-wheel 75, which meshes with a pinion 76, fixedly mounted upon the secondary shaft 8. The head 65 carries a number of spring-pressed arms 77. These arms 77 are arranged in three series of four each, the said arms being pivotally mounted at 78 upon projecting lugs secured to and forming a part of rings 79, mounted in the interior of the head. The arms each carry a roller 80, and annular coil-springs 81 embrace each set of arms and tend to press them together. As the stock is forced forwardly past the cutters 53 it will be received successively by the successive sets of arms, and the said stock will force the arms outwardly against the spring tension, which will operate to press them with a yielding force toward the stock and will adjust themselves to the shape which the stock has assumed after being operated upon by the cutters. The relative sizes of the gears 75 and 76 and the gears 67 and 68 are the same, and hence the heads 64 and 65 will rotate in unison. The head 65 will continue to cause the rotation of the stock after it has passed out of the feed-trough 69 and away from the rotary head 64. It may further be noticed that the ratio of the gears 50 and 49 is the same as of the gears 67 and 68 and of the gears 75 and 76. Hence not only will the rotary heads 64 and 65 rotate in unison, but so, also, will the pattern 48.

Figure 7:
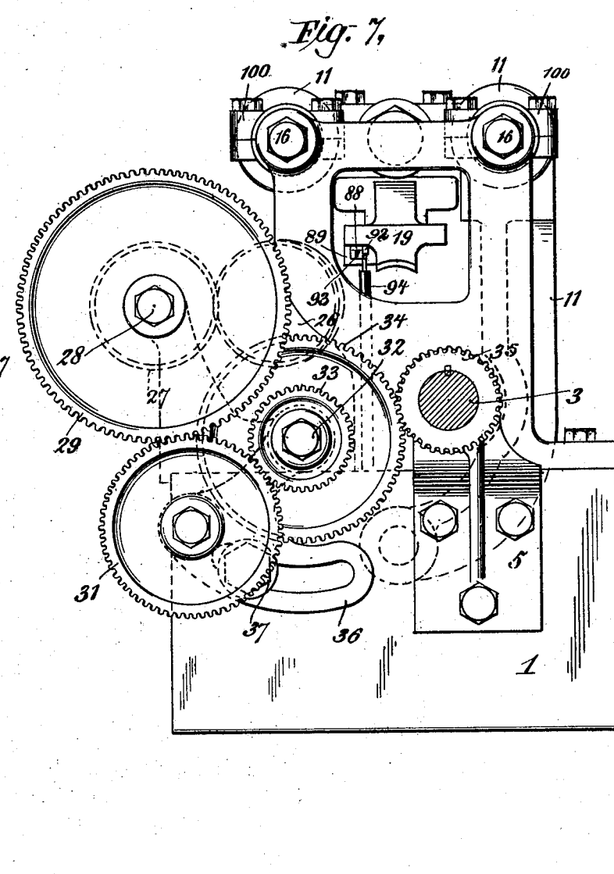
Fig. 7 is an end view of the lathe.

I have provided means whereby after the stock has been placed by hand in the feed-trough 69 the stock may be forced forwardly to a point just in advance of the cutters before the feed-trough, rotary heads, and pattern are started to revolve. I accomplish this result by driving the feed-carriage from the main shaft 3, while the pattern, feed-trough, and rotary heads are driven from the secondary shaft 8. A clutch-lever 82 is suitably mounted upon a rock-shaft 83, journaled in a fixed support 84, secured to the bed of the machine. An operating-lever 85 is also secured to the rock-shaft 83, and a link 86 connects the operating-lever 85 with a lever 87, which is rigidly secured to the rock-shaft 43, upon which is also mounted the starting-lever 44. The connecting-link 86 and the lever 87 have a slotted connection which allows a certain movement of the one relatively to the other in one direction before movement is transmitted from one to the other. An operating-rod 88 is loosely supported at one end in a loop or bearing 89, secured by the rack 19, and at the other end is pivotally connected at 90 with a second operating-lever 91, secured to the rock-shaft 83. The rear end of the operating-rod 88 carries a pawl 92. (See Fig. 3.) The rack-bar is provided with a pin 93, (shown more clearly in Figs. 3 and 7,) and the said pin is located upon the rack-bar at such a point that in the rest position of the machine the said pin is at some distance from the pawl 92 of the operating-rod 88, but directly in the path of movement thereof. After the carriage, which includes the feed-plunger 12 and the rock-bar 19, has moved a predetermined distance—that is, to a point whereat the stock in the feed-trough has been forced almost up to the cutters 53—the pin 93 will engage the pawl 92 upon the operating-rod 88 and upon further movement of the carriage will carry the operating-rod 88 forwardly with it. The effect of this will be to partially rotate the rock-shaft 83 upon its support and by reason of the engagement of the clutch-lever 82 with the movable member 10 of the clutch 7 to cause an engagement of the two members of the clutch, which will rotatably connect the secondary shaft 8 with the drive-shaft 3. As the operating-rod 88 is moved forwardly the pawl 92 carried thereby will gradually be withdrawn from engagement with the pin 93 by means of a stationary abutment 94, which is in the path of movement of the pawl 92, and the carriage carrying the pin 93 will be permitted to continue its movement without further movement of the rod 88. The clutch having been once engaged will remain engaged until it is positively disengaged. When the rock-shaft 83 was partially rotated, as just described, no effect was produced upon the rock-shaft 43 because of the slotted connection between the link 86 and the lever 87, the movement of the rock-shaft 83 being just sufficient to take up the lost motion of this slotted connection and no more. The feed-carriage will continue to move forwardly until a stud 95, which is secured to the cross-head 11 of the said carriage, strikes an arm 96, which is rigidly secured upon the rock-shaft 43. Further forward movement of the carriage will rock the shaft 43 upon its bearings and by reason of the link connection 86 with the operating-levers 85 of the rock-shaft 83 will also rock the shaft 83 upon its support. This will throw the toggle-links 40 out of line and will disengage the worm 20 with the teeth upon the rack 19 and will positively disengage the clutch member 10 from the clutch 7. The disengagement of the worm 20 with the teeth of the rack 19 will permit the rearward movement of the feed-carriage which will be effected by means of the weight 97, which is secured by a flexible connection 98, which passes over stationary pulleys 99 and connects with the said carriage. The carriage will be drawn backwardly until the cross-head 11 butts against back-stops 100, which are clamped upon the guide-rods 16. The back-stops 100 have forwardly-projecting portions which enter recesses in the cross-head 11, and the air confined thereby in these recesses and which will leak out slowly will form an air-cushion to prevent shock. At any time, however, the operation of the machine can be entirely stopped by the hand-lever 44. If the feed-carriage only is being operated at the time it is desired to stop the machine, then the feed-carriage only will be affected by a movement of the said lever; but if the heads are being operated and the pattern operated at such time then these parts will also be thrown out of operation by manipulation of the said handle.

I have shown the back-stops 100 as provided with tongues 114, which may engage with grooves 101, provided at various places along the guide-rods 16, and the back-stops 100 may be adjusted in various positions along the guide-rods, so as to engage with any one of these recesses in order to vary the length of travel of the said feed-carriage.

Shorter travel of the feed-carriage will only be required when a shorter pattern 48 is employed, and hence if the back-stops 100 be advanced upon the guide-rods 16 the pattern-supporting heads 45 and 46 will be required to be brought nearer together. The pattern-supporting head 45 must for this purpose be moved and readjusted farther in advance along the carrier 13. I have shown several tapped holes in the carrier 13, which are adapted to receive the bolts of the bearing 45 and which are correctly spaced in accordance with the space between the grooves 101 in the guide-rods 16.

By advancing the bearing-head 45 the same distance as the back-stops 100 are advanced the lost motion between the cross-head 11 and the carrier 13, due to the loose engagement of the said cross-head 11 with the reduced portion of the shaft 14, is maintained.

It is desirable in stopping the machine to stop the rotary head 64 in such a position that the feed-trough 69 shall be in a position with its open side upward, in which position it is shown in the drawings. To effect this, I have provided a stop-motion which is operated by the rock-shaft 83, and hence is operated whenever the clutch 7 is operated. The rotary head 64 carries a notched projection 102, and a stop 103 is mounted in a housing 104, which is pivotedly connected at 105 upon a stationary support secured to the bed of the machine. The lower portion of the stop 103 fits accurately in cross-section in the housing 104, while lengthwise it is permitted some relative movement. A spring 106 tends to exert pressure upwardly against the stop, the said spring being mounted in a cylindrical bore in the said plunger and bearing against a cylindrical stud which extends upwardly from the base of the housing into the said bore. The stop 103 is connected by an arm 107, rigidly mounted upon the rock-shaft 83, by means of a spring-link 108, which is connected at its opposite end to the housing 104. The spring-link 108 is made in two parts, and a spring 109 (see Fig. 4) is interposed between them to give a limited movement of the stop 103 upon its axial support 105 under spring tension. When the rock-shaft 83 is rocked to cause the engagement of the secondary member 10 of the clutch 7 with the member carried by the shaft 3, the stop 103 is drawn out of engagement with the notched projection 102 upon the head 64, and the head is then left free to revolve upon the revolution of the secondary shaft 8. When the rock-shaft 83 is rotated in the opposite direction, so as to disengage the secondary member 10 of the clutch 7, the stop 103 is pressed forwardly into the path of the notched projection 102. When the notched projection 102 comes around, it will be engaged by the tooth of the stop 103, and the otary head 64 will be prevented from rotating any further. Shock will be taken up by the spring 106 and by the air which is locked between the lower portion of the stop 103 and its housing. The notched projection 102 is so positioned in the rotary head 64 that when it is engaged by the tooth of the stop 103 the feed-trough 69 will be in the desired predetermined position. The spring 109, interposed between the two members of the connecting-links 108, will permit sufficient movement of the stop 103 and its housing 104 to allow the lower portion of the notched projection 102 to pass the tooth of the stop 103, so that the notch in the said projection will be engaged by the said tooth. The upper end of the tooth of the stop 103 is rounded, as is also the lower end of the projection 102, in order to facilitate this movement.

Figure 8:
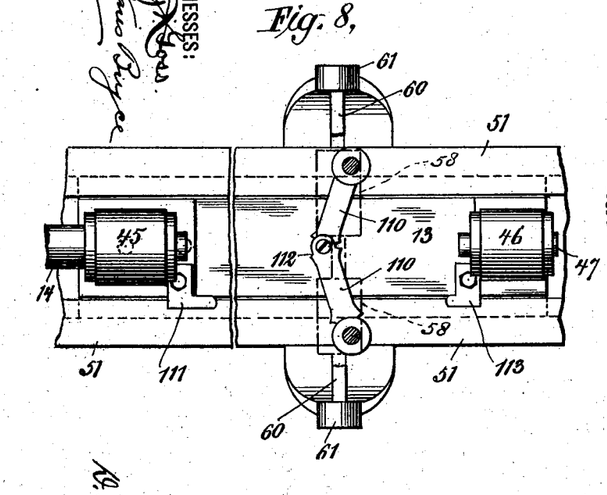
Fig. 8 is a top view in detail of certain mechanism employed for throwing the rotary cutters into and out of operation.

When the feed-carriage has substantially completed its forward stroke and the pattern and head rotating mechanism has been disengaged from its source of power, it is further desirable to force the pattern-followers out of engagement with the pattern in order that upon the return of the feed-carriage, and with it the return relative movement of the pattern and its followers lengthwise of the longitudinal axis of the pattern, in this case the longitudinal rearward movement of the pattern itself, the follower or followers shall not wear a groove or grooves in the side or sides of the pattern. If such provision were not made, it is likely that wear would soon be apparent, owing to the fact that the pattern being connected by gearing with the head is always stopped in the same relative position with respect to the followers, and hence the wear would always come substantially upon the same lines. I have hence provided a pair of toggle-links 110, pivotally connected together at their inner ends and at their outer ends pivotally connected to the pattern-followers 58. When the followers are operating to follow the contour of the pattern, the links are out of line, substantially as shown in the detail Fig. 8, but play backward and forward with the movements of the said followers 58. The links are of such length that they are never drawn into line with each other by the greatest possible movement of the followers 58, actuated by the pattern. When, however, the limit of the desired lengthwise movement of the pattern is approximately reached, a projection 111, carried by the pattern-carrier 13, strikes one of the toggle-links and forces the said links first into a straight line and then just beyond such line. Stop-shoulders 112 on the said links prevent any further movement of the said links and tend to lock them into the position into which they have been forced. The effect will be to force the followers 58, with their follower-rollers, clear of the pattern, and they will remain locked in such position until released by a second projection 113, also carried by the pattern-carrier 13, and which will force the links rearwardly out of line at approximately the completion of the said return movement.

The projection 111 is preferably secured to the bearing-head 45, so that when the said head is adjusted for different lengths of patterns the projection will be moved with it, and hence similarly adjusted.

A complete cycle of operation of the machine is then as follows: The "stock," which is preferably material substantially square in cross-section and of the desired length, is dropped by hand or otherwise into the feed-trough 69, which is at such time stationary and has its open side uppermost. The hand-lever 44 is then thrown to the left or into the position in which it is shown in Fig. 1. This will throw the worm 20, which is continuously rotating, into engagement with the teeth of the feed-rack 19, and the feed-carriage and plunger 12 will move forwardly and will force the stock in the feed-trough into the head 64. During this portion of the operation of the machine the heads 64 and 65 and the pattern 48 are held stationary against rotation. Further, the cross-head 11 of the feed-carriage during this portion of its movement is traversing the reduced portion 15 of the pattern-shaft 14, and hence no lengthwise movement is transmitted to the said pattern. When the stock is forced into the head 64, it is engaged by the pressure-rollers 70, carried by the plungers 73, which act at right angles to each other and grasp the stock with a yielding pressure which will hold it centrally, while permitting it to be fed lengthwise. After the stock has been completely engaged by the head in this manner and just before it has reached the cutters 53 the pin 93, carried by the feed-carriage, will engage the pawl 92 of the operating-rod 88 and will cause the engagement of the clutch 7 to start the secondary shaft 8 into operation and will at the same time withdraw the stop 103 from engagement with the notched projection carried by the revoluble head 64 to permit of such operation. At approximately the same moment the cross-head 11 of the feed-carriage will have traversed the limit of its movement along the reduced portion 15 of the pattern-shaft 14 and in its further movement will transmit lengthwise movement to the pattern. Thus when the stock is fed to a position wherein it is engaged by the cutters the revoluble heads and the pattern will be revolving in unison and the pattern will be moving lengthwise at the same rate of speed as the stock is being fed forwardly. The stock will thus be given a form depending upon the form of the pattern. The second rotary head 65 will receive the stock after the forward end has passed the cutters and will operate to grasp the stock at such times and also at such times as the rear end thereof has passed clear of the first head 64. After the stock has finally passed clear of the cutters the stud 95 upon the feed-carriage will strike the arm 96 and will partially rotate the rock-shaft 43 upon its support. The effect of this, as previously stated, will be to disengage the worm 20 from the teeth of the feed-rack 19, to disengage the secondary shaft-clutch member 10 from the drive-shaft member, and to throw the stop 103 into the path of movement of the notched projection carried by the revoluble head 64. At approximately the same moment the projection 111, carried by the pattern-carrier 13, will straighten the toggle-levers 110 and will disengage the pattern-followers from the pattern. The effect of the foregoing will be to stop the revoluble heads, the feed-trough, and the pattern in a predetermined position all within a single revolution of the revoluble heads and because of the disengagement of the worm with the feed-rack to permit the return movement of the feed-carriage, and with it the pattern, to their initial positions under the influence of the weight 97. All the parts will thus be automatically returned to their normal positions, and the machine will have completed a cycle of operations and be at rest and ready to go through the same cycle again.

I have thus provided a lathe for turning irregular forms which is entirely automatic throughout its entire cycle of operations and in which stock may be operated upon without being mounted between centers and without handling from the time it is dropped into the machine up to the time it is delivered.

I do not desire, of course, to be limited to the precise details of construction or combination of parts herein shown and described, as the same may obviously be varied within wide limits without departing from the spirit and scope of my invention.

What I claim is—

1. In a lathe for turning irregular forms, the combination with a revoluble head, of means for feeding stock therethrough, a rotary cutter, a pattern, a pattern-follower adapted to control the position of the rotary cutter, and means for causing a relative movement of the pattern and follower, the one with the other, in directions both lengthwise and circumferential of the longitudinal axis of the pattern.

2. In a lathe for turning irregular forms, the combination with a revoluble head, of means for feeding stock therethrough, a rotary cutter, a pattern, a pattern-follower adapted to control the position of the rotary cutter, means for causing a relative movement of the pattern and follower, the one with the other, in a direction lengthwise of the axis of rotation of the follower, and means for simultaneously revolving the pattern and the head.

3. In a lathe for turning irregular forms, the combination with a revoluble head, of means for feeding stock therethrough, a pattern-controlled rotary cutter, a pattern, means for feeding the pattern lengthwise of its axis of rotation, and means for simultaneously revolving the pattern and the head.

4. In a lathe for turning irregular forms, the combination with a revoluble head, of a feed-plunger adapted in its movement to bear against the end of the stock to be operated upon, and to feed it lengthwise through the revolving head, a rotary cutter, a pattern, a pattern-follower adapted to control the position of the rotary cutter, and means for causing a relative movement of the pattern and follower, the one with the other, in direction both lengthwise and circumferential of the longitudinal axis of the pattern.

5. In a lathe for turning irregular forms, the combination with a revoluble head, of a feed-plunger adapted in its movement to bear against the end of the stock to be operated upon, and to feed it lengthwise through the revolving head, a pattern-controlled rotary cutter, a pattern, means for feeding the pattern lengthwise of its axis of rotation, and means for simultaneously revolving the pattern and the head.

6. In a lathe for turning irregular forms, the combination with a revoluble head, of a revoluble feed-plunger adapted in its movement to bear against the end of the stock to be operated upon, and to feed it lengthwise through the revolving head, a rotary cutter, a pattern, a pattern-follower adapted to control the position of the rotary cutter, and means for causing a relative movement of the pattern and follower, the one with the other, in directions both lengthwise and circumferential of the longitudinal axis of the pattern.

7. In a lathe for turning irregular forms, the combination with a revoluble head, of a revoluble feed-plunger adapted in its movement to bear against the end of the stock to be operated upon, and to feed it lengthwise through the revolving head, a pattern-controlled rotary cutter, a pattern, means for feeding the pattern lengthwise of its axis of rotation, and means for simultaneously revolving the pattern and the head.

8. In a lathe for turning irregular forms, the combination with a revoluble head having a receiving-trough projecting rearwardly therefrom, of means for feeding stock, received by said receiving-trough, through the said head, a rotary cutter, a pattern, a pattern-follower adapted to control the position of the rotary cutter, and means for causing a relative movement of the pattern and follower, the one with the other, in directions both lengthwise and circumferential of the longitudinal axis of the pattern.

9. In a lathe for turning irregular forms, the combination with a revoluble head having a receiving-trough projecting rearwardly therefrom, of means for feeding stock, received by said receiving-trough, through the said head, a pattern-controlled rotary cutter, a pattern, means for feeding the pattern lengthwise of its axis of rotation, and means for simultaneously revolving the pattern and the head.

10. In a lathe for turning irregular forms, the combination with a revoluble head having an open-sided receiving-trough projecting rearwardly therefrom, of means for feeding stock, received by said receiving-trough, through the said head, a rotary cutter, a pattern, a pattern-follower adapted to control the position of the rotary cutter, and means for causing a relative movement of the pattern and follower, the one with the other, in directions both lengthwise and circumferential of the longitudinal axis of the pattern.

11. In a lathe for turning irregular forms, the combination with a revoluble head having an open-sided receiving-trough projecting rearwardly therefrom, of means for feeding stock, received by said receiving-trough, through the said head, a pattern-controlled rotary cutter, a pattern, means for feeding the pattern lengthwise of its axis of rotation, and means for simultaneously revolving the pattern and the head.

12. In a lathe for turning irregular forms, the combination with a pattern-controlled rotary cutter, of a revoluble head for receiving and revolving the stock to be operated upon, means for feeding the stock therethrough and means for stopping the revoluble head in a predetermined position.

13. In a lathe for turning irregular forms, the combination with a pattern-controlled rotary cutter, of a revoluble head having an open-sided receiving-trough, means for revolving the said head, and means for stopping the revoluble head with the open side of the feed-trough uppermost.

14. In a lathe for turning irregular forms, the combination with a pattern-controlled rotary cutter, of a revoluble head for receiving and revolving the stock to be operated upon, means for feeding the stock therethrough, means for disconnecting the revoluble head with its source of power, and automatic means for stopping the said head in a predetermined position when so disconnected.

15. In a lathe for turning irregular forms, the combination with a pattern-controlled rotary cutter, of a revoluble head for receiving and revolving the stock to be operated upon, means for feeding the stock through the revoluble head, and automatic means, operated by the feeding means in its movement, for disconnecting the revoluble head from its source of power after the stock has been fed entirely through, and past, the said head.

16. In a lathe for turning irregular forms, the combination with a pattern-controlled rotary cutter, of a revoluble head for receiving and revolving the stock to be operated upon, means for feeding the stock through the revoluble head, and automatic means, operated by the feeding means in its movement, for disconnecting the revoluble head from its source of power after the stock has been fed entirely through, and past, the said head, and for stopping the said head in a predetermined position when so disconnected.

17. In a lathe for turning irregular forms, the combination with a pattern-controlled rotary cutter, of a revoluble head for receiving and revolving the stock to be operated upon, the said head having a notch or shoulder, means for feeding the stock through said head, a stop fixedly secured against rotation with the head and means for causing a relative movement of said stop and said notch or shoulder, whereby said stop is caused to engage and disengage the said notch or shoulder of the said head.

18. In a lathe for turning irregular forms, the combination with a pattern-controlled rotary cutter, of a revoluble head for receiving and revolving the stock to be operated upon, the said head having a notch or shoulder, means for feeding the stock through said head, a stop pivotally mounted at one end to a fixed point and means adapted, when said stop is rocked upon its pivotal support to cause same to engage or disengage the said notch or shoulder of the said head.

19. In a lathe for turning irregular forms, the combination with a pattern-controlled rotary cutter, of a revoluble head for receiving and revolving the stock to be operated upon, the said head having a notch or shoulder, means for feeding the stock through said head, a cushioned stop fixedly secured against rotation with the head, and means for causing a relative movement of said stop and said notch or shoulder, whereby said stop is caused to engage and disengage the said notch or shoulder of the said head.

20. In a lathe for turning irregular forms, the combination with a pattern-controlled rotary cutter, of a revoluble head for receiving and revolving the stock to be operated upon, the said head having a notch or shoulder, means for feeding the stock through said head, a spring-cushioned stop fixedly secured against rotation with the head, and means for causing a relative movement of said stop and said notch or shoulder, whereby said stop is caused to engage and disengage the said notch or shoulder of the said head.

21. In a lathe for turning irregular forms, the combination with a pattern-controlled rotary cutter, of a revoluble head for receiving and revolving the stock to be operated upon, the said head having a notch or shoulder, an air-cushioned stop fixedly secured against rotation with the head, and means for causing a relative movement of said stop and said notch or shoulder, whereby said stop is caused to engage and disengage the said notch or shoulder of the said head.

22. In a lathe for turning irregular forms, the combination with a pattern-controlled rotary cutter, of a revoluble head for receiving and revolving the stock to be operated upon, the said head having a notch or shoulder, a spring and air cushioned stop fixedly secured against rotation with the head, and means for causing a relative movement of said stop and said notch or shoulder, whereby said stop is caused to engage and disengage the said notch or shoulder of the said head.

23. In a lathe for turning irregular forms, the combination with a pattern-controlled rotary cutter, of a revoluble head for receiving and revolving the stock to be operated upon, the said head having a notch or shoulder, a stop fixedly secured against rotation with the head, and means, having an elastic connection with the said stop, for causing the same to engage with the said notch or shoulder of the said head.

24. In a lathe for turning irregular forms, the combination with a pattern-controlled rotary cutter, of a revoluble head for receiving and revolving the stock to be operated upon, the said head having a notch or shoulder, a stop fixedly secured against rotation with the head, means for causing the same to engage with the said notch or shoulder of the said head, and a spring-link between the said means and the said stop.

25. In a lathe for turning irregular forms, the combination with a pattern-controlled rotary cutter and a revoluble head, of means for primarily feeding the stock into the head while the said head is stationary and subsequently for simultaneously revolving the said head and feeding the said stock therethrough.

26. In a lathe for turning irregular forms, the combination with a pattern-controlled rotary cutter and a revoluble head having an open-sided receiving-trough projecting rearwardly therefrom, of means for primarily feeding the stock into the head while the said head is stationary and subsequently for simultaneously revolving the said head and feeding the stock therethrough.

27. In a lathe for turning irregular forms, the combination with a pattern-controlled rotary cutter and a revoluble head having an open-sided receiving-trough projecting rearwardly therefrom, of means for primarily feeding the stock into the head while the said head is stationary and subsequently for simultaneously revolving the said head and feeding the said stock therethrough, and means for stopping the head and trough in a predetermined position.

28. In a lathe for turning irregular forms, the combination with a pattern-controlled rotary cutter, and a revoluble head for receiving and revolving the stock to be operated upon, of means for feeding the stock through the said head, and means operatively connected by the said feeding means after the feeding means has passed through a portion of its forward movement, for revolving the said head.

29. In a lathe for turning irregular forms, the combination with a pattern-controlled rotary cutter, and a revoluble head for receiving and revolving the stock to be operated upon, of means for feeding the stock through the said head, and means whereby the head is held stationary while the stock is fed into the same, and whereby the head is revolved while the stock is fed through the same.

30. In a lathe for turning irregular forms, the combination with a pattern-controlled rotary cutter, and a revoluble head for receiving and revolving the stock to be operated upon, of a feed-plunger for feeding the stock through the said head, means whereby the said head may be rotated while the feed-plunger is feeding the stock therethrough, a clutch for connecting the said means with a source of power, and means carried by the feed-plunger for operating said clutch after the feed-plunger has moved through a portion of its stroke.

31. In a lathe for turning irregular forms, the combination with a pattern-controlled rotary cutter, and a revoluble head for receiving and revolving the stock to be operated upon, of a feed-plunger for feeding the stock through the said head, a drive-shaft, means for operating the feed-plunger from the drive-shaft, a secondary shaft, a clutch between said primary and said secondary shaft, means for revolving the head from the secondary shaft, and means carried by the feed-plunger for operating said clutch after the feed-plunger has moved through a portion of its stroke in one direction.

32. In a lathe for turning irregular forms, the combination with a pattern-controlled rotary cutter, and a revoluble head for receiving and revolving the stock to be operated upon, of means for feeding the stock through the said head, means operatively connected by the said feeding means after the feeding means has passed through a portion of its movement in one direction, and during the time it is operating to feed the stock through the head, for revolving the said head, and means operated by the said feeding means at substantially the completion of its forward movement for stopping the said head in a predetermined position.

33. In a lathe for turning irregular forms, the combination with a pattern-controlled rotary cutter, and a revoluble head for receiving and revolving the stock to be operated upon, of a feed-plunger for feeding the stock through the said head, means whereby the said head may be rotated, a clutch for operatively connecting and disconnecting the said means with a source of power, and means carried by the feed-plunger for operatively connecting the said clutch, after the feed-plunger has moved through a portion of its forward movement, and for disconnecting the said clutch at substantially the completion of the forward movement thereof.

34. In a lathe for turning irregular forms, the combination with a pattern-controlled rotary cutter, and a revoluble head for receiving and revolving the stock to be operated upon, of a feed-plunger for feeding the stock through the said head, means whereby the said head may be rotated, a clutch for operatively connecting and disconnecting the said means with a source of power, means carried by the feed-plunger for operatively connecting the said clutch, after the feed-plunger has moved through a portion of its forward movement, and for disconnecting the said clutch at substantially the completion of the forward movement thereof, and means for stopping the said head in a predetermined position.

35. In a lathe for turning irregular forms, the combination with a pattern-controlled rotary cutter, and a revoluble head for receiving and revolving the stock to be operated upon, of a feed-plunger for feeding the stock through the said head, a drive-shaft, means for operating the feed-plunger from the drive-shaft, a secondary shaft, means for revolving the head from the secondary shaft, a clutch between the drive-shaft and the secondary shaft, and means carried by the feed-plunger whereby the clutch will be operatively connected after the feed-plunger has moved through a portion of its forward movement, and whereby it will be disconnected after the feed-plunger has substantially completed its forward movement.

36. In a lathe for turning irregular forms, the combination with a pattern-controlled rotary cutter, and a revoluble head for receiving and revolving the stock to be operated upon, of a feed-plunger for feeding the stock through the said head, a drive-shaft, means for operating the feed-plunger from the drive-shaft, a secondary shaft, means for revolving the head from the secondary shaft, a clutch between the drive-shaft, and the secondary shaft, means carried by the feed-plunger whereby the clutch will be operatively connected after the feed-plunger has moved through a portion of its forward movement, and whereby it will be disconnected after the feed-plunger has substantially completed its forward movement, and means for stopping the said head in a predetermined position.

37. In a lathe for turning irregular forms, the combination with a revoluble head, a rotary cutter, and a pattern for controlling same, of means for feeding the stock through the head and for imparting lengthwise movement to the pattern after, and only after, the feeding means has passed through a portion of its forward movement.

38. In a lathe for turning irregular forms, the combination with a revoluble head, a rotary cutter, and a pattern for controlling same, of means for primarily feeding the stock into the head while the pattern is out of operative connection, and subsequently for simultaneously operating the pattern and feeding the stock through the head.

39. In a lathe for turning irregular forms, the combination with a revoluble head, a rotary cutter, and a pattern for controlling same, of means for primarily feeding the stock into the head, and subsequently for simultaneously moving the pattern lengthwise and feeding the stock through the head.

40. In a lathe for turning irregular forms, the combination with a revoluble head, a rotary cutter, and a revoluble pattern for controlling same, of means for primarily feeding the stock into the head, and subsequently for simultaneously moving the pattern lengthwise of its axis of rotation and feeding the stock through the head.

41. In a lathe for turning irregular forms, the combination with a revoluble head, a rotary cutter, and a pattern for controlling same, of means for primarily feeding the stock into the head while the said head is stationary and the pattern out of operative connection, and subsequently for operating the pattern and simultaneously revolving the said head and feeding the said stock therethrough.

42. In a lathe for turning irregular forms, the combination with a revoluble head, a rotary cutter, and a pattern for controlling same, of means for primarily feeding the stock into the head while the said head is stationary, and subsequently for moving the pattern lengthwise and simultaneously revolving the said head and feeding the said stock therethrough.

43. In a lathe for turning irregular forms, the combination with a revoluble head, a rotary cutter, and a revoluble pattern for controlling same, of means for primarily feeding the stock into the head while the said head is stationary, and subsequently for moving the pattern lengthwise of its axis of rotation and simultaneously revolving the said head and feeding the said stock therethrough.

44. In a lathe for turning irregular forms, the combination with a revoluble head, a rotary cutter, and a pattern for controlling same, of means for feeding the stock through the head, said means adapted in its movement to impart lengthwise movement to the said pattern.

45. In a lathe for turning irregular forms, the combination with a revoluble head, a rotary cutter, and a pattern for controlling same, of means for feeding the stock through the head, said means adapted, during a portion of its movement only, to impart lengthwise movement to the said pattern.

46. In a lathe for turning irregular forms, the combination with a revoluble head, a rotary cutter, and a pattern for controlling same, of a plunger for feeding the stock through the head, said plunger having a shoulder adapted, during a portion of the movement of the plunger, to impart lengthwise movement to the pattern.

47. In a lathe for turning irregular forms, the combination with a revoluble head, a rotary cutter, and a pattern for controlling same, of a support for said pattern and a feed-carriage, carrying means for feeding the stock through the head, said feed-carriage and support adapted to operatively engage each other during a portion of the movement of the feed-carriage.

48. In a lathe for turning irregular forms, the combination with a revoluble head, a rotary cutter, and a pattern for controlling same, of means for feeding the stock through the head, and means operatively connected by the said feeding means, after the feeding means has passed through a portion of its forward movement, for revolving the said head and for imparting lengthwise movement to the pattern.

49. In a lathe for turning irregular forms, the combination with a revoluble head, a rotary cutter, and a pattern for controlling same, of means for feeding the stock through the head, and means operatively connected by the said feeding means, after the feeding means has passed through a portion of its forward movement, for revolving the said pattern, and for imparting lengthwise movement thereto.

50. In a lathe for turning irregular forms, the combination with a revoluble head, a rotary cutter, and a pattern for controlling same, of means for feeding the stock through the head, and means operatively connected by the said feeding means, after the feeding means has passed through a portion of its forward movement, for revolving the said head and the said pattern, and for imparting lengthwise movement to the pattern.

51. In a lathe for turning irregular forms, the combination with a revoluble head for receiving and revolving the stock to be operated upon, a rotary cutter, and a pattern for controlling same, of means for feeding the stock through the said head, and means whereby the head is held stationary while the stock is fed into same, and whereby the head is revolved, and the pattern moved lengthwise, while the stock is fed through the said head.

52. In a lathe for turning irregular forms, the combination with a revoluble head for receiving and revolving the stock to be operated upon, a rotary cutter, and a pattern for controlling same, of means for feeding the stock through the said head, means whereby the said head and pattern may be rotated in unison, a clutch for connecting the said means, and means operated by the said feeding means, in its movement, for operating the said clutch.

53. In a lathe for turning irregular forms, the combination with a revoluble head for receiving and revolving the stock to be operated upon, a rotary cutter, and a pattern for controlling same, of means for feeding the stock through the said head, means whereby the said head and pattern may be rotated in unison, a clutch for connecting the said means, and means operated by the said feeding means, in its movement, for operating the said clutch, and for imparting lengthwise movement to the said pattern.

54. In a lathe for turning irregular forms, the combination with a revoluble head for receiving and revolving the stock to be operated upon, a rotary cutter, and a pattern for controlling same, of a feed-plunger for feeding the stock through the said head, a drive-shaft, means for operating the feed-plunger from the drive-shaft, a secondary shaft, means for revolving the head and the pattern from the secondary shaft, a clutch between the drive-shaft and the secondary shaft, and means carried by the feed-plunger for operating said clutch.

55. In a lathe for turning irregular forms, the combination with a revoluble head for receiving and revolving the stock to be operated upon, a rotary cutter, and a pattern for controlling same, of a feed-plunger for feeding the stock through the said head, a drive-shaft, means for operating the feed-plunger from the drive-shaft, a secondary shaft, means for revolving the head and the pattern from the secondary shaft, a clutch between the drive-shaft and the secondary shaft, and means carried by the feed-plunger for operating said clutch, and for imparting lengthwise movement to the said pattern.

56. In a lathe for turning irregular forms, the combination with a revoluble head, a rotary cutter, and a pattern for controlling same, of means for feeding the stock through the revoluble head, and simultaneously operating upon the same with the rotary cutter, and means for adjusting the extent of movement of the said feeding means.

57. In a lathe for turning irregular forms, the combination with a revoluble head, a rotary cutter, and a pattern for controlling same, of means for feeding the stock through the revoluble head, and an adjustable back-stop for limiting the extent of movement of the said feeding means.

58. In a lathe for turning irregular forms, the combination with a revoluble head, a rotary cutter, and a pattern for controlling same, of a feed-carriage provided with a plunger for feeding the stock through the revoluble head, a guide-rod for said carriage, and an adjustable back-stop on said guide-rod for limiting the extent of movement of the said feed-carriage.

59. In a lathe for turning irregular forms, the combination with a revoluble head, a rotary cutter, a pattern for controlling same, and adjustable supports for the pattern, of means for feeding the stock through the revoluble head, and means for adjusting the extent of movement of the said feeding means.

60. In a lathe for turning irregular forms, the combination with a revoluble head, a rotary cutter, a pattern for controlling same, and supports for the pattern, of means for feeding the stock through the revoluble head, means for adjusting the extent of movement of the said feeding means, and means whereby the relative position of the said pattern-supports may be adjusted.

61. In a lathe for turning irregular forms, the combination with a revoluble head, a rotary cutter, a pattern for controlling same, and supports for the pattern relatively adjustable toward and away from each other, of a feed-carriage provided with a plunger for feeding the stock through the revoluble head, and an adjustable back-stop for limiting the extent of movement of the feed-carriage.

62. In a lathe for turning irregular forms, the combination with a revoluble head, a rotary cutter, and a pattern for controlling same, of means for feeding the stock through the revoluble head, and a cushion back-stop for limiting the return movement of the said feeding means.

63. In a lathe for turning irregular forms, the combination with a revoluble head, a rotary cutter, and a pattern for controlling same, of means for feeding the stock through the revoluble head, and an adjustable cushion back-stop for limiting the return movement of the said feeding means.

64. In a lathe for turning irregular forms, the combination with a revoluble head, a rotary cutter, and a pattern for controlling same, of means for feeding the stock through the revoluble head, and an air-cushion back-stop for limiting the return movement of the said feeding means.

65. In a lathe for turning irregular forms, the combination with a revoluble head, a rotary cutter, and a pattern for controlling same, of means for feeding the stock through the revoluble head, and an adjustable air-cushion back-stop for limiting the return movement of said feeding means.

66. In a lathe for turning irregular forms, the combination with a revoluble head, a rotary cutter, and a pattern for controlling same, of a feed-carriage provided with a plunger for feeding the stock through the revoluble head, a guide-rod for said feed-carriage, and an adjustable back-stop on said guide-rod, said back-stop having a plunger projecting therefrom, said plunger fitting, and adapted to engage, a recess in the carriage.

67. In a lathe for turning irregular forms, the combination with a revoluble head, and a pattern-controlled rotary cutter, of means for revolving the head and for feeding the stock therethrough, hand-operated means for first throwing in the feed, automatic means for throwing in the head-revolving means, after the feed has passed through a portion of its forward stroke, and automatic means for throwing both said means out of operation at substantially the end of a forward stroke.

68. In a lathe for turning irregular forms, the combination with a revoluble head, a pattern-controlled rotary cutter, means for revolving the head, and means independent thereof for feeding the stock through the said head, of hand-operated means for connecting and disconnecting the feeding means independently of the head-revolving means, while the head-revolving means is disconnected, and for simultaneously disconnecting the feeding means and the head-revolving means when they are both operatively connected.

69. In a lathe for turning irregular forms, the combination with a revoluble head, a pattern-controlled rotary cutter, and means for revolving the head and for feeding the stock therethrough, of means for connecting, with a source of power, the feeding means and the head-revolving means independently of each other, and means for dependently disconnecting both of the said means.

70. In a lathe for turning irregular forms, the combination with a revoluble head, a pattern-controlled rotary cutter, and means for revolving the head and for feeding the stock therethrough, of means for connecting, with a source of power, the feeding means and the head-revolving means independently of each other, and hand-operated means for dependently disconnecting both of the said means.

71. In a lathe for turning irregular forms, the combination with a revoluble head, a pattern-controlled rotary cutter, and means for revolving the head and for feeding the stock therethrough, of means for connecting, with a source of power, the feeding means and the head-revolving means independently of each other, and automatic means for dependently disconnecting both of the said means.

72. In a lathe for turning irregular forms, the combination with a revoluble head, a pattern-controlled rotary cutter, and means for revolving the head and for feeding the stock therethrough, of a hand-lever for disconnecting and connecting the feeding means, and an automatic means for connecting the head-revolving means after the feeding means has passed through a portion of its stroke.

73. In a lathe for turning irregular forms, the combination with a revoluble head, a pattern-controlled rotary cutter, and means for revolving the head and for feeding the stock therethrough, of a hand-lever for connecting and disconnecting the feeding means, and means, operated by the feeding means in its movement, for connecting the head-revolving means after the said feeding means has passed through a portion of its forward movement, and for disconnecting the feeding means after it has substantially completed its forward movement.

74. In a lathe for turning irregular forms, the combination with a revoluble head, a pattern-controlled rotary cutter, and means for revolving the head and for feeding the stock therethrough, of a hand-lever for connecting and disconnecting the feeding means, and means operated by the feeding means for connecting the head-revolving means after the said feeding means has passed through a portion of its forward stroke, and for disconnecting both the head-revolving means and the feeding means after it has substantially completed its forward movement.

75. In a lathe for turning irregular forms, the combination with a revoluble head, a pattern-controlled rotary cutter, and means for revolving the head and for feeding the stock therethrough, of a hand-lever for connecting and disconnecting the feeding means, a clutch for connecting and disconnecting the head-revolving means, and a loose connection between the said hand-lever and the said clutch.

76. In a lathe for turning irregular forms, the combination with a revoluble head, a pattern-controlled rotary cutter, and means for revolving the head and for feeding the stock therethrough, of a hand-lever for connecting and disconnecting the feeding means, a clutch for connecting and disconnecting the head-revolving means, and a slotted link connection between the said hand-lever and the said clutch.

77. In a lathe for turning irregular forms, the combination with a revoluble head, a pattern-controlled rotary cutter, and means for revolving the head and for feeding the stock therethrough, of a hand-lever for connecting and disconnecting the feeding means, a clutch for connecting and disconnecting the head-revolving means, a clutch-operating lever, a slotted connection between the said hand-lever, and the clutch-operating lever, and means carried by the feeding means for moving the clutch-lever in one direction during one portion of its forward movement, and for operating the hand-lever and moving the clutch-lever in the opposite direction during another portion of its forward movement.

78. In a lathe for turning irregular forms, the combination with two revoluble heads, of means for feeding stock therethrough, a rotary cutter, arranged intermediate of the said heads, a pattern, a pattern-follower adapted to control the position of the rotary cutter, and means for causing a relative movement of the pattern and follower, the one with the other, in directions both lengthwise and circumferential of the longitudinal axis of the pattern.

79. In a lathe for turning irregular forms, the combination with two revoluble heads, of means for feeding stock therethrough, a rotary cutter arranged intermediate of the said heads, a pattern, a pattern-follower adapted to control the position of the rotary cutter, means for causing a relative movement of the pattern and follower, the one with the other, in a direction lengthwise of the axis of rotation of the pattern, and means for simultaneously revolving the pattern and the heads.

80. In a lathe for turning irregular forms, the combination with two revoluble heads, of means for feeding stock therethrough, a pattern-controlled rotary cutter arranged intermediate of the said heads, a pattern, means for feeding the pattern lengthwise of its axis of rotation, and means for simultaneously revolving the pattern and the heads.

81. In a lathe for turning irregular forms, the combination with two revoluble heads, of a feed-plunger adapted in its movement to bear against the end of the stock to be operated upon, and to feed it lengthwise through the revolving heads, a rotary cutter arranged intermediate of the said heads, a pattern, a pattern-follower adapted to control the position of the rotary cutter, and means for causing a relative movement of the pattern and follower, the one with the other, in directions both lengthwise and circumferential of the longitudinal axis of the pattern.

82. In a lathe for turning irregular forms, the combination with two revoluble heads, of a feed-plunger adapted in its movement to bear against the end of the stock to be operated upon, and to feed it lengthwise through the revolving heads, a pattern-controlled rotary cutter arranged intermediate of the said heads, a pattern, means for feeding the pattern lengthwise of its axis of rotation, and means for simultaneously revolving the pattern and the heads.

83. In a lathe for turning irregular forms, the combination with two revoluble heads, of a revoluble feed-plunger adapted in its movement to bear against the end of the stock to be operated upon, and to feed it lengthwise through the revolving heads, a rotary cutter arranged intermediate of the said heads, a pattern, a pattern-follower adapted to control the position of the rotary cutter, and means for causing a relative movement of the pattern and follower, the one with the other, in directions both lengthwise and circumferential of the longitudinal axis of the pattern.

84. In a lathe for turning irregular forms, the combination with two revoluble heads, of a revoluble feed-plunger adapted in its movement to bear against the end of the stock to be operated upon, and to feed it lengthwise through the revolving heads, a pattern-controlled rotary cutter arranged intermediate of the said heads, a pattern, means for feeding the pattern lengthwise of its axis of rotation, and means for simultaneously revolving the pattern and the heads.

85. In a lathe for turning irregular forms, the combination with two revoluble heads, one of which has a receiving-trough projecting rearwardly therefrom, of means for feeding stock, received by said receiving-trough, through both the said heads, a rotary cutter arranged intermediate of the said heads, a pattern, a pattern-follower adapted to control the position of the rotary cutter, and means for causing a relative movement of the pattern and follower, the one with the other, in directions both lengthwise and circumferential of the longitudinal axis of the pattern.

86. In a lathe for turning irregular forms, the combination with two revoluble heads, one of which has a receiving-trough projecting rearwardly therefrom, of means for feeding stock, received by said receiving-trough, through both the said heads, a pattern-controlled rotary cutter arranged intermediate of the said heads, a pattern, means for feeding the pattern lengthwise of its axis of rotation, and means for simultaneously revolving the pattern and the heads.

87. In a lathe for turning irregular forms, the combination with two revoluble heads, one of which has an open-sided receiving-trough projecting rearwardly therefrom, of means for feeding stock, received by said receiving-trough, through both the said heads, a rotary cutter arranged intermediate of the said heads, a pattern, a pattern-follower adapted to control the position of the rotary cutter, and means for causing a relative movement of the pattern and follower, the one with the other, in directions both lengthwise and circumferential of the longitudinal axis of the pattern.

88. In a lathe for turning irregular forms, the combination with two revoluble heads, one of which has an open-sided receiving-trough projecting rearwardly therefrom, of means for feeding stock, received by said receiving-trough, through both the said heads, a pattern-controlled rotary cutter arranged intermediate of the said heads, a pattern, means for feeding the pattern lengthwise of its axis of rotation, and means for simultaneously revolving the pattern and the heads.

89. In a lathe for turning irregular forms, the combination with a pattern-controlled rotary cutter, of two revoluble heads one arranged forwardly and the other rearwardly of the said cutter, said heads adapted to receive and revolve the stock to be operated upon, means for feeding the stock through the said heads, and means for stopping the rearward head in a predetermined position.

90. In a lathe for turning irregular forms, the combination with a pattern-controlled rotary cutter, of two revoluble heads one arranged forwardly and the other rearwardly of the said cutter, the rearward head having an open-sided receiving-trough, means for revolving the said heads, and means for stopping the said rearward head with the open side of the feed-trough uppermost.

91. In a lathe for turning irregular forms, the combination with a pattern-controlled rotary cutter, of two revoluble heads one arranged forwardly and the other rearwardly of the said cutter, said heads adapted to receive and revolve the stock to be operated upon, means for feeding the stock through the said heads, means for disconnecting the rearward revoluble head with its source of power, and automatic means for stopping the said head in a predetermined position when so disconnected.

92. In a lathe for turning irregular forms, the combination with a pattern-controlled rotary cutter, of two revoluble heads one arranged forwardly and the other rearwardly of the said cutter, said heads adapted to receive and revolve the stock to be operated upon, means for feeding the stock through the revoluble heads, and automatic means, operated by the feeding means in its movement, for disconnecting the rearward revoluble head from its source of power after the stock has been fed entirely through, and past, the said head.

93. In a lathe for turning irregular forms, the combination with a pattern-controlled rotary cutter, of two revoluble heads one arranged forwardly and the other rearwardly of the said cutter, said heads adapted to receive and revolve the stock to be operated upon, means for feeding the stock through the revoluble heads, and automatic means, operated by the feeding means in its movement, for disconnecting the rearward revoluble head from its source of power after the stock has been fed entirely through, and past, the said head, and for stopping the said head in a predetermined position when so disconnected.

94. In a lathe for turning irregular forms, the combination with a pattern-controlled rotary cutter, of two revoluble heads one arranged forwardly and the other rearwardly of the said cutter, said heads adapted to receive and revolve the stock to be operated upon, the said rearward head having a notch or shoulder, means for feeding the stock through said head, a stop fixedly secured against rotation with the head, and means for causing a relative movement with the said stop with said notch or shoulder whereby said stop is caused to engage and disengage the said notch or shoulder of the said head.

95. In a lathe for turning irregular forms, the combination with two revoluble heads, a rotary cutter arranged between the said heads, and a pattern for controlling said cutter, of means for primarily feeding the stock into the first head while the pattern is out of operative connection, and subsequently for simultaneously operating the pattern and feeding the stock through both the heads.

96. In a lathe for turning irregular forms, the combination with two revoluble heads, a rotary cutter arranged between the said heads, and a pattern for controlling said cutter, of means for primarily feeding the stock into the first head, and subsequently for simultaneously moving the pattern lengthwise and feeding the stock through both the heads.

97. In a lathe for turning irregular forms, the combination with two revoluble heads, a rotary cutter arranged between the said heads, and a revoluble pattern for controlling said cutter, of means for primarily feeding the stock into the first head, and subsequently for simultaneously moving the pattern lengthwise of its axis of rotation and feeding the stock through both the said heads.

98. In a lathe for turning irregular forms, the combination with two revoluble heads, a rotary cutter arranged between the said heads, and a pattern for controlling said cutter, of means for primarily feeding the stock into the first head while the said head is stationary and the pattern out of operative connection, and subsequently for operating the pattern and simultaneously revolving both the said heads and feeding the said stock therethrough.

99. In a lathe for turning irregular forms, the combination with two revoluble heads, a rotary cutter arranged between the said heads, and a pattern for controlling said cutter, of means for primarily feeding the stock into the first head while the said head is stationary, and subsequently for moving the pattern lengthwise and simultaneously revolving both the said heads and feeding the said stock therethrough.

100. In a lathe for turning irregular forms, the combination with two revoluble heads, a rotary cutter arranged between said heads, and a revoluble pattern for controlling same, of means for primarily feeding the stock into the first head while the said head is stationary, and subsequently for moving the pattern lengthwise of its axis of rotation and simultaneously revolving both the said heads and feeding the said stock therethrough.

101. In a lathe for turning irregular forms, the combination with two revoluble heads for receiving and revolving the stock to be operated upon, a rotary cutter arranged between the said heads, and a pattern for controlling same, of means for feeding the stock through the said heads, and means whereby the heads are held stationary while the stock is fed into the first head, and whereby the heads are revolved, and the pattern moved lengthwise, while the stock is fed through both the said heads.

102. In a lathe for turning irregular forms, the combination with two revoluble heads for receiving and revolving the stock to be operated upon, a rotary cutter arranged between the said heads, and a pattern for controlling said cutter, of a feed-plunger for feeding the stock through the said heads, a drive-shaft, means for operating the feed-plunger from the drive-shaft, a secondary shaft, means for revolving both the heads and the pattern from the secondary shaft, a clutch between the drive-shaft and the secondary shaft, and means carried by the feed-plunger for operating said clutch.

103. In a lathe for turning irregular forms, the combination with two revoluble heads for receiving and revolving the stock to be operated upon, a rotary cutter arranged between the said heads, and a pattern for controlling said cutter, of a feed-plunger for feeding the stock through the said heads, a drive-shaft, means for operating the feed-plunger from the drive-shaft, a secondary shaft, means for revolving both the heads and the pattern from the secondary shaft, a clutch between the drive-shaft and the secondary shaft, and means carried by the feed-plunger for operating said clutch, and for imparting lengthwise movement to the said pattern.

104. In a lathe for turning irregular forms, the combination with two revoluble heads, a rotary cutter arranged between the said heads, and a pattern for controlling said cutter, of means for primarily feeding the stock into the first head while the said head is stationary, and subsequently for simultaneously revolving both the said heads and feeding the stock therethrough.

105. In a lathe for turning irregular forms, the combination with two revoluble heads, the first one of which has an open-sided receiving-trough projecting rearwardly therefrom, a rotary cutter arranged between the said heads, and a pattern for controlling said cutter, of means for primarily feeding the stock into the first head while the said head is stationary, and subsequently for simultaneously revolving both the said heads and feeding the stock therethrough.

106. In a lathe for turning irregular forms, the combination with two revoluble heads, a rotary cutter arranged between the said heads, and a pattern for controlling said cutter, of a feed-plunger for feeding the stock through the said heads, means whereby the said heads may be rotated, a clutch for connecting the said means with a source of power, and means carried by the feed-plunger for operating said clutch after the feed-plunger has moved through a portion of its stroke, and at such time as the forward end of the stock has reached a point substantially opposite the said cutter.

107. A revoluble head, for a lathe for turning irregular forms, and through which stock is adapted to feed and by which it may be rotated, having a fixed angular way or trough for receiving the stock, and a spring-pressure or follower roller arranged oppositely thereto, and adapted to force the stock with a yielding pressure against the said angular way or trough.

108. A revoluble head, for a lathe for turning irregular forms, and through which stock is adapted to feed and by which it may be rotated, having a fixed right-angled way or trough, and two spring-pressure rollers, arranged to operate in lines at right angles to each other, and perpendicular to the sides of the said way or trough.

109. In a lathe for turning irregular forms, the combination of two revoluble heads for receiving and rotating the stock to be operated upon, and a pattern-controlled rotary cutter arranged between the said heads, one of the said heads having therein a fixed support adapted to hold the stock and to cause same to be fed in a predetermined axial line, and the other of the said heads having a plurality of spring-pressure devices adapted to grasp the stock with a yielding pressure at different points around its periphery.

110. In a lathe for turning irregular forms, the combination of two revoluble heads for receiving and rotating the stock to be operated upon, and a pattern-controlled rotary cutter arranged between the said heads, one of the said heads having therein a fixed support adapted to hold the stock and to cause same to be fed in a predetermined axial line, and the other of said heads having a plurality of arms pivotally mounted therein, and springs adapted to draw the arms together with a yielding pressure.

111. In a lathe for turning irregular forms, the combination of two revoluble heads for receiving and rotating the stock to be operated upon, and a pattern-controlled rotary cutter arranged between the said heads, one of the said heads having therein a fixed support adapted to hold the stock and to cause same to be fed in a predetermined axial line, and the other of said heads having a plurality of arms pivotally mounted therein, and a coil-spring surrounding the said arms, and tending to draw them together.

112. In a lathe for turning irregular forms, the combination of two revoluble heads for receiving and rotating the stock to be operated upon, and a pattern-controlled rotary cutter arranged between the said heads, one of the said heads having therein a fixed support adapted to hold the stock and to cause same to be fed in a predetermined axial line, and the other of said heads having several sets of pressure devices therein, each set comprising a plurality of arms pivotally mounted around the axis of rotation of the said head, and a coil-spring surrounding the said arms, and tending to draw them together.

113. A revoluble head, for a lathe for turning irregular forms, and through which stock is adapted to be fed, and by which it may be rotated, having a plurality of arms pivotally mounted therein, and springs connected with said arms and connecting the said arms together, said springs adapted to draw the said arms together with a yielding pressure.

114. A revoluble head, for a lathe for turning irregular forms, and through which stock is adapted to be fed, and by which it may be rotated, having a plurality of arms pivotally mounted therein, and a coil-spring surrounding the said arms, and tending to draw them together.

In testimony whereof I have hereunto set my hand, before two subscribing witnesses, this 6th day of February, 1901.

WILLIAM L. COLE.

Witnesses:
D. HOWARD HAYWOOD,
HARRY T. GOSS.